No. 714,050. Patented Nov. 18, 1902.
F. C. SOUTHWELL & O. RALLS.
HAY LOADER.
(Application filed Aug. 30, 1901.)
(No Model.)
Fig. 1.
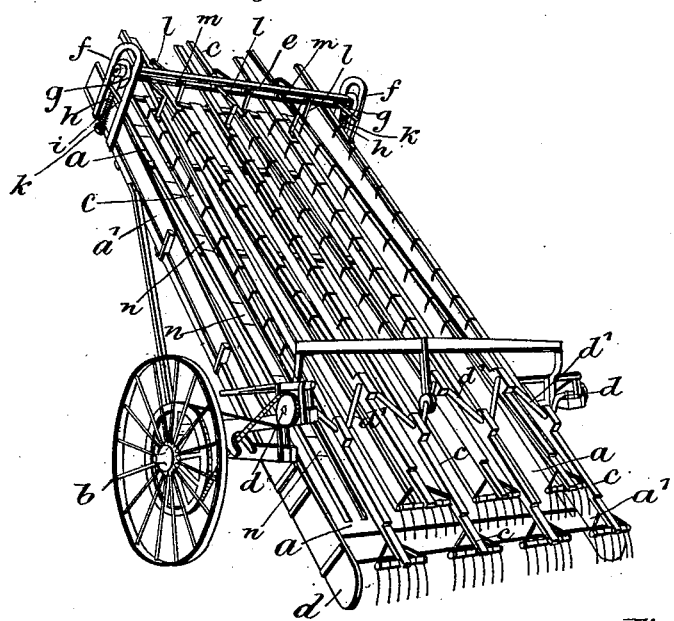
Fig. 2.
Fig. 3.
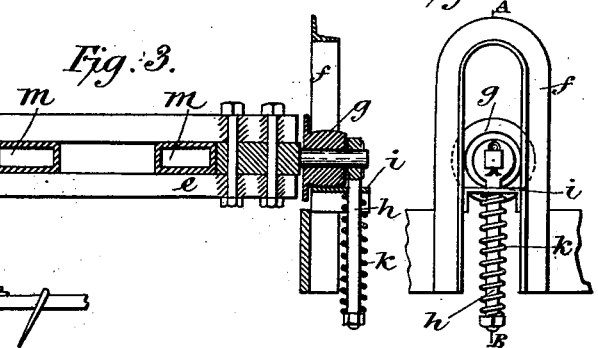
Fig. 7.
Fig. 6.
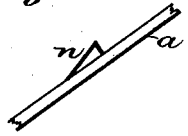
Fig. 4.
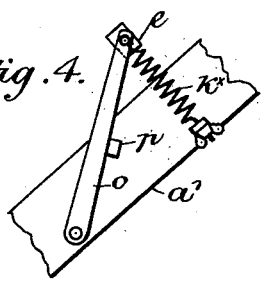
Fig. 5.
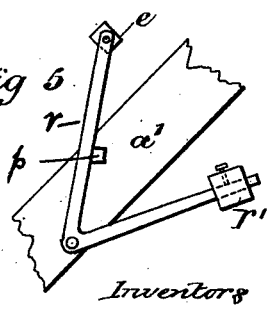
Witnesses.
A. M. Parkins,
J. A. MacDonald
Inventors
Frederick Charles Southwell
and Orlando Ralls,
By their Attorneys
Baldwin, Davidson & Wight

UNITED STATES PATENT OFFICE.

FREDERICK CHARLES SOUTHWELL, OF SUTTON, AND ORLANDO RALLS, OF PERSHORE, ENGLAND.

HAY-LOADER.

SPECIFICATION forming part of Letters Patent No. 714,050, dated November 18, 1902.

Application filed August 30, 1901. Serial No. 73,836. (No model.)

*To all whom it may concern:*

Be it known that we, FREDERICK CHARLES SOUTHWELL, merchant, residing at Westdown, Sutton, in the county of Surrey, and ORLANDO RALLS, engineer, residing at Sunnyside, Pershore, in the county of Worcester, England, subjects of the King of Great Britain, have invented certain new and useful Improvements in Hay-Loaders, of which the following is a specification.

This invention relates to improvements in machines for loading hay, &c., onto wagons of the type in which the crop is raised and conveyed upward along an inclined platform by rake-teeth on bars which extend upward from end to end of the platform and which near their lower ends are connected alternately to opposite cranks on a crank-shaft driven from the wheels on which the machine is supported, so that the rake-bars receive a movement toward and away from the platform, as well as a longitudinal to-and-fro movement, and half the rakes are moving the crop upward along the platform while the other half are moving downward and are raised away from the platform, so as not to act upon the crop. In such machines the upper ends of the rake-bars usually have the requisite movement toward and away from the platform given to them either by curved or inclined irons secured to them and made to rest upon a bar or bridge fixed transversely across the upper end of the platform and at a distance from it, or by links connected with the bar, or in other ways. If the transverse bar at the top is set too close to the platform, the delivery capacity of the space between the upper ends of the bars and the platform is too small and the delivery may become choked. On the other hand, there are disadvantages if the transverse bar is set too far away from the platform.

According to this invention we mount the transverse bar or support in such a way that it can move freely toward or away from the platform. The material as it passes along below the bars tends to raise the transverse bridge away from the platform, while springs or weights tend to draw the bridge toward the platform, and thus the delivery capacity of the space at the top is regulated by the amount of crop that is being delivered. In order also that the delivery of the crop that is being raised may be rendered as uniform as practicable, we secure wedge-shaped strips of wood or other material to the fixed inclined platform, the base of the wedges being uppermost, so that the crop as it is moved upward moves easily past the strips; but the broad base of the strips obstruct it from slipping back.

Figure 1 is a perspective view of a hayloader having our improvements applied to it. Fig. 2 is a side elevation, on a larger scale, showing the way in which we mount the bridge-piece. Fig. 3 is a transverse section on the line A B, Fig. 2. Figs. 4 and 5 show modified ways of drawing the bridge-piece toward the platform. Fig. 6 is a side elevation of a portion of one of the longitudinal bars of the platform having a wedge-piece secured to it. Fig. 7 is a detail view showing one of the inclined irons, one of which is fixed to the upper end of each rake-bar.

In the figures, $a$ is the platform, having the lower end of its side bars $a'$ supported in the usual way upon wheels $b$, while their extremities rest on the ground.

$c$ represents the bars, carrying rake-teeth.

$d'$ represents cranks on a crank-shaft $d$, to which the lower ends of the bars are connected. The crank-shaft is, as usual, driven at its ends by chain and chain-wheel gear from the wheels $b$.

$e$ is the bridge-piece, extending across the upper end of the platform. At its ends it can slide up and down toward and away from the platform between guides $f$.

$g$ represents rollers at the ends of the bridge-piece to work between the guides to reduce friction. The projections from the ends of the bridge-piece upon which the rollers turn have descending bars $h$ fixed to them. Each bar $h$ passes downward through a hole in a strap $i$, fixed across the guides $f$.

$k$ is a spring surrounding the bar and bearing at one end against a nut on the lower end of the bar and at its other end against the under side of the strap $i$. The strap $i$ also forms a stop for the rollers $g$ to come against to prevent the bridge-piece from being drawn downward too close to the platform.

Inclined irons $l$ are fixed, as usual, to the upper ends of the bars $c$. These pass through guide-eyes $m$ on the bridge-piece and give to the upper ends of the bars an up-and-down movement when the bars are moved endwise to and fro.

$n\ n$ are the wedge-shaped pieces, fixed to the upper surface of the bars $a$ of which the platform is composed.

As shown in Fig. 6, the base of each wedge-piece is placed toward the upper end of the platform.

Fig. 4 shows how the bridge-piece $e$ in place of working up and down between fixed guides may at its ends be carried by links $o$ and similarly drawn downward toward the platform by springs $k^\times$.

$p$ is a stop to prevent the bridge-piece from being drawn down too close to the platform.

Fig. 5 shows how the same result can be attained by a lever $r$, weighted with a weight $r'$, which serves as an equivalent for a spring.

What we claim is—

1. The combination of an inclined platform, rake-bars mounted to move over the platform, a crank-shaft to which the lower ends of the rake-bars are connected, a bridge-piece extending across the upper end of the platform above the rake-bars and movable toward and from the platform, springs connected with the bridge-piece and tending to move it toward the platform, stops for limiting the inward movement of the bridge-piece toward the platform, and connections between the upper ends of the bars and the bridge-piece for the purpose specified.

2. The combination of an inclined platform, rake-bars mounted to move over the platform, a crank-shaft to which the lower ends of the rake-bars are connected, a bridge-piece extending across the upper end of the platform above the rake-bars and moving toward and from the platform, springs connected with the bridge-piece and tending to move it toward the platform, stops for limiting the inward movement of the bridge-piece toward the platform, and means interposed between the bridge-piece and the upper ends of the rake-bars for increasing the distance between the upper ends of the rake-bars and the platform independently of any movement given to the bridge-piece when the rake-bars are moved downward.

FREDERICK CHARLES SOUTHWELL.
ORLANDO RALLS.

Witnesses:
J. H. WHITEHEAD,
F. C. WEATHERLY.